US009163850B2

(12) United States Patent
Kim et al.

(10) Patent No.: US 9,163,850 B2
(45) Date of Patent: Oct. 20, 2015

(54) DISPLAY DEVICE FOR AIR CONDITIONER AND METHOD OF CONTROLLING THE DISPLAY DEVICE

(71) Applicant: LG ELECTRONICS INC., Seoul (KR)

(72) Inventors: Hyunjung Kim, Changwon-si (KR); Jongsun Jeon, Changwon-si (KR); Moonsung Kim, Changwon-si (KR); Grami Ryu, Changwon-si (KR); Jisun Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 13/954,132

(22) Filed: Jul. 30, 2013

(65) Prior Publication Data

US 2014/0097962 A1 Apr. 10, 2014

(30) Foreign Application Priority Data

Oct. 10, 2012 (KR) ........................ 10-2012-0112301

(51) Int. Cl.
*G08B 7/00* (2006.01)
*F24F 11/00* (2006.01)
*B60Q 1/00* (2006.01)
*F21V 7/04* (2006.01)
*G05B 21/00* (2006.01)

(52) U.S. Cl.
CPC .............. *F24F 11/0086* (2013.01); *G08B 7/00* (2013.01); *F24F 11/0012* (2013.01); *F24F 2011/0038* (2013.01); *F24F 2011/0091* (2013.01)

(58) Field of Classification Search
USPC .............................................. 340/691.6, 438
See application file for complete search history.

(56) References Cited

U.S. PATENT DOCUMENTS

| | | | | |
|---|---|---|---|---|
| 2005/0229610 | A1 * | 10/2005 | Park et al. | 62/126 |
| 2007/0028635 | A1 * | 2/2007 | Gleeson | 62/239 |
| 2007/0030413 | A1 * | 2/2007 | Lippmann et al. | 349/61 |
| 2009/0128312 | A1 * | 5/2009 | Sawada et al. | 340/438 |
| 2013/0268125 | A1 * | 10/2013 | Matsuoka | 700/276 |
| 2013/0274943 | A1 * | 10/2013 | Nojima et al. | 700/295 |

* cited by examiner

*Primary Examiner* — Jack K Wang
(74) *Attorney, Agent, or Firm* — Ked & Associates, LLP

(57) ABSTRACT

An air conditioner including notification device is provided. The device may include an input device receiving input information regarding operation of the air conditioner, a controller comparing the input information with previously mapped information and controlling the operation of the air conditioner, and an output device outputting primary information regarding the operation of the air conditioner based on a control command received from the controller. Secondary information may be visually or audibly changed and output by the output device corresponding to a change in the primary information. A method of controlling such a device may include changing input information regarding operation of the air conditioner, changing and outputting primary information in response to the change in the input information, and visually or audibly changing and outputting the secondary information based on the change in the primary information.

17 Claims, 15 Drawing Sheets

Fig.4

| PRIMARY INFORMATION | SECONDARY INFORMATION | |
|---|---|---|
| TEMPERATURE(℃) | NUMBER OF PATTERNS | COLOR INTENSITY |
| 18~21 | 50 | MUTED ↑ |
| 22 | 40 | |
| 23 | 35 | |
| 24 | 30 | |
| 25 | 25 | |
| 26 | 20 | |
| 27~30 | 10 | ↓ STRONG |

Fig.6

| PRIMARY INFORMATION | SECONDARY INFORMATION | |
|---|---|---|
| FLOW VELOCITY | NUMBER OF PATTERNS | COLOR INTENSITY |
| POWERFUL | 4 | STRONG |
| STRONG | 3 | ↕ |
| MEDIUM | 2 | |
| MILD | 1 | MUTED |

DISPLAY DEVICE FOR AIR CONDITIONER AND METHOD OF CONTROLLING THE DISPLAY DEVICE

CROSS-REFERENCE TO RELATED APPLICATION(S)

This application claims priority under 35 U.S.C. §119 to Korean Application No. 10-2012-0112301 filed on Oct. 10, 2012, whose entire disclosure is hereby incorporated by reference.

BACKGROUND

1. Field

This relates to a display device for an air conditioner and a method of controlling the display device.

2. Background

Air conditioners maintain indoor air in a cool state in summer and in a warm state in winter, control humidity of indoor air, and purify indoor air. An air conditioner, in which a refrigeration cycle is driven, may include a compressor, a condenser, an expansion device, and an evaporator. Air conditioners may be classified into split type air conditioners with indoor units and outdoor units separated from one another and integral type air conditioners with indoor units and outdoor units integrally coupled with one another as a single unit. Air conditioners may also be classified, based on installation methods, into wall-mounted type air conditioners, frame type air conditioners, and free-standing slim type air conditioners.

Such air conditioners may include a suction part suctioning air from an indoor space, a heat exchanger performing heat-exchange with the air suctioned in via the suction part, and a discharge part discharging the heat-exchanged air into the indoor space. A blowing fan may generate air movement from the suction part to the discharge part.

BRIEF DESCRIPTION OF THE DRAWINGS

The embodiments will be described in detail with reference to the following drawings in which like reference numerals refer to like elements wherein:

FIG. 4 illustrates a process in which secondary information is changed according to a change in primary information, according to an embodiment as broadly described herein.

FIG. 6 illustrates a process in which secondary information is changed according to a change in primary information, according to another embodiment as broadly described herein.

DETAILED DESCRIPTION

Reference will now be made in detail to various embodiments, examples of which are illustrated in the accompanying drawings. Features may be embodied in many different forms and should not be construed as being limited to the embodiments set forth herein; rather, alternate embodiments falling within the spirit and scope of the present disclosure may easily be derived through adding, altering, and/or changing by those skilled in the art.

Figure 1:
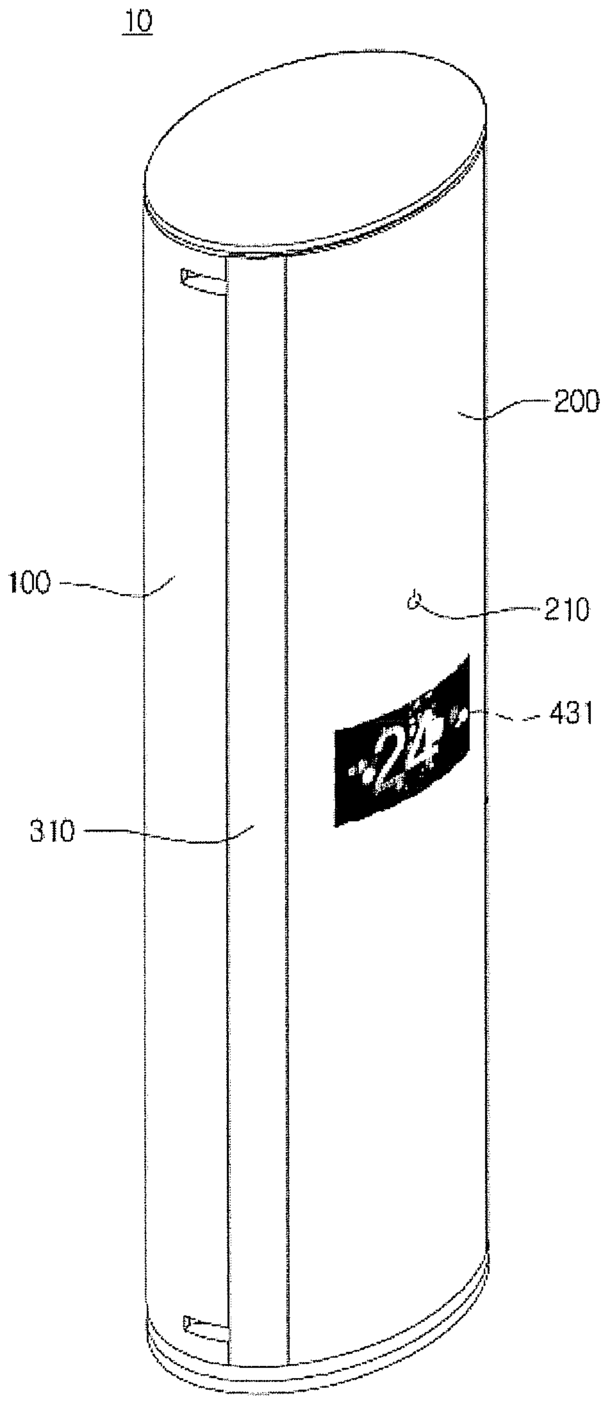
FIG. 1 is a perspective view of an exemplary air conditioner according to an embodiment as broadly described herein.
Figure 2:
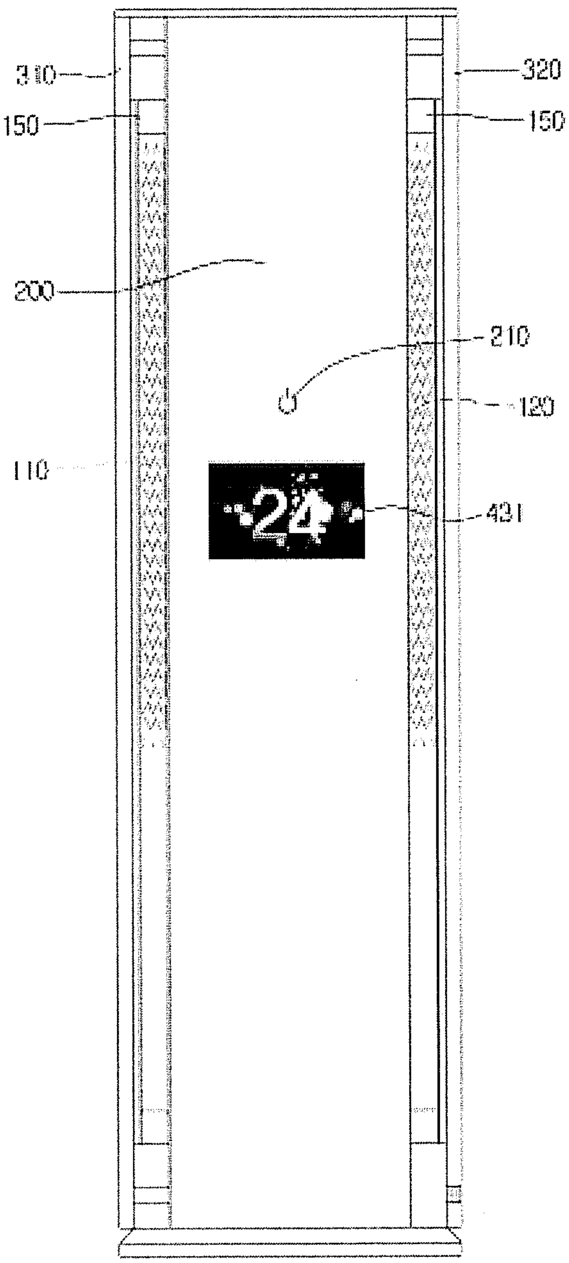
FIG. 2 is a front view of the air conditioner shown in FIG. 1.

Referring to FIGS. 1 and 2, an exemplary air conditioner 10 may include a case 100 forming an inner space, a movable panel 200 provided at a front of the case 100, and discharge panels 310 and 320 provided on at least one side of the movable panel 200. The case 100 may define a rounded exterior and may have an approximate oval shape overall. The movable panel 200 and the discharge panels 310 and 320 may be at least partially rounded, to correspond to the shape of the case 100. The movable panel 200 may include an input device 210 for receiving input information regarding operation of the air conditioner 10. For example, the input device 210 may be a power input device for turning power to the air conditioner 10 on or off.

The discharge panels 310 and 320 may include a first discharge panel 310 provided on one side of the movable panel 200 and a second discharge panel 320 provided on another side of the movable panel 200. The first discharge panel 310 and the second discharge panel 320 may be transferred, or moved, in one of a direction toward, or adjacent to, the movable panel 200 or a direction away from the moveable panel 200. An image output device 431 may be provided at one side of the movable panel 200 to output an operation state of the air conditioner 10. The user may preset an operation method of the air conditioner 10 via the input device 210. Also, the user may preset the operation method using a communication device, such as a remote control, or may preset the operation method using remote communications such as wifi. However, methods of setting the operation of the air conditioner 10 are not limited thereto.

When the user turns on power to the air conditioner 10 using the input device 210, the first discharge panel 310 and the second discharge panel 320 may move away from the movable panel 200. For example, the first discharge panel 310 may move in a clockwise direction, and the second discharge panel 320 may move in a counterclockwise direction, thus opening corresponding sections of the case 100. When the first and second discharge panels 310 and 320 are open, a discharge vane 150 may be exposed in each of the open areas. The discharge vane 150 may rotate or move to open a first discharge port 110 and a second discharge port 120 so that air may be discharged through both sides of the movable panel 200. In this case, depending on a rotation angle or a transfer distance of the discharge vane 150, a flow direction of the air discharged from the first discharge port 110 and/or the second discharge port 120 may be controlled.

On the other hand, when the input device 210 is operated while operating the air conditioner 10, power to the air conditioner 10 may be turned off. While turning off the power, the discharge vane 150 may shield the first discharge port 110 and/or the second discharge port 120. Also, the first discharge panel 310 and the second discharge panel 320 may be moved back toward the movable panel 200 and shield the first discharge port 110 and the second discharge port 120. For example, the first discharge panel 310 may be transferred counterclockwise, and the second discharge panel 320 may be transferred clockwise.

The air conditioner 10 may allow the user to control an operation method of the air conditioner 10. For example, the user may control the operation method of the air conditioner 10 by using the input device 210. Then, the air conditioner 10 may perform operations according to the preset operation method. Also, the user may check the preset operation method of the air conditioner 10 via an output device 430. For example, the user may check a preset operation state of the air conditioner 10 via one of the image output device 431 outputting an image and/or a sound output device 432 outputting a sound.

Figure 3:
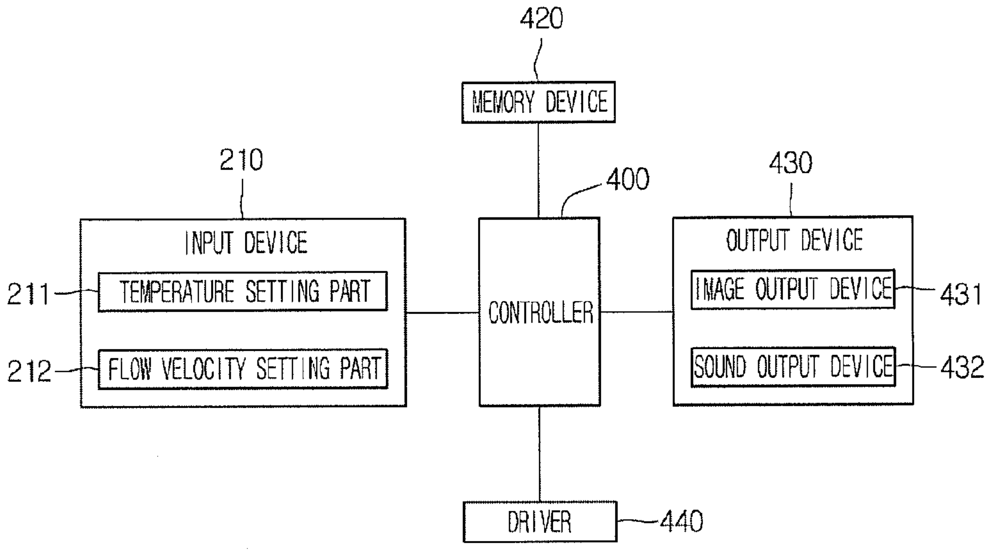
FIG. 3 is a block diagram of an air conditioner according to an embodiment as broadly described herein.

Referring to FIG. 3, the air conditioner 10 may include the input device 210 for receiving input information regarding operation of the air conditioner 10, the output device 430 outputting the received input information, a memory 420 in which data output by the output device 430 is stored, a controller 400 controlling the air conditioner 10 based on information received by the input device 210 and the information stored in the memory 420, a driver 440 and a controller 400.

The output device 430 may include the image output device 431 allowing the user to visually check matching information and the sound output device 432 allowing the user to check audibly the matching information.

To input information for operating the air conditioner 10, the user may input the desired information via the input device 210 and/or may input the information via voice. Also, the user may input the information using a communication module. For example, the communication module may be a remote control and one of communication means or a terminal operating wifi.

The input device 210 may include a temperature setting part 211 for setting a desired indoor temperature and a wind, or flow, velocity setting part 212 for setting a wind velocity.

The information inputted by the user via the input device 210 is transferred to the controller 400. The controller 400 controls information previously stored in the memory 420 and the information received at the input device 210 to be matched, and the matched information is output via the output device 430.

Referring to FIG. 4, the user may control an operation method of the air conditioner 10 to generate a suitable indoor environment. That is, the user may transfer information to the air conditioner 10, including first, or primary, information regarding operation of the air conditioner 10 and secondary information related to a visual indicator corresponding to a change of the primary information.

For example, the primary information may be information regarding a temperature, and the secondary information may be information regarding a change in patterns to be displayed according to a change of the temperature. In other words, when the user changes a desired temperature, one of a number of patterns, or an intensity of color may be changed accordingly to provide the user with a visual indicator of the change in temperature. Since the changed temperature may be checked by the user directly via the image output device 431, this may be designated as primary information. Since the number of patterns or the intensity of color of the patterns may be changed in response to a change of the first information, this may be designated as secondary information.

For example, the user increases a desired temperature, the number of patterns displayed may be gradually decreased and/or the strength, or intensity, of color thereof may be gradually increased. For example, when the user increases the desired temperature by 1 degree, the number of patterns may be decreased by 5 and the strength of color thereof may be increased by one stage.

However, the number of patterns and the strength of color thereof are not limited thereto. That is, when the user increases the desired temperature, the number of patterns may be increased or the strength of color thereof may be gradually decreased.

Figure 5A:
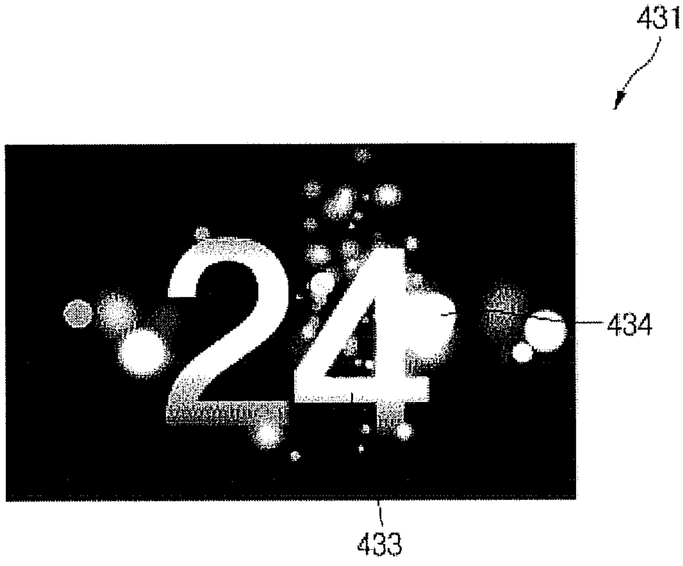
FIGS. 5A to 5C are exemplary display screens of set up information of the air conditioner, according to an embodiment as broadly described herein.
Figure 5B:
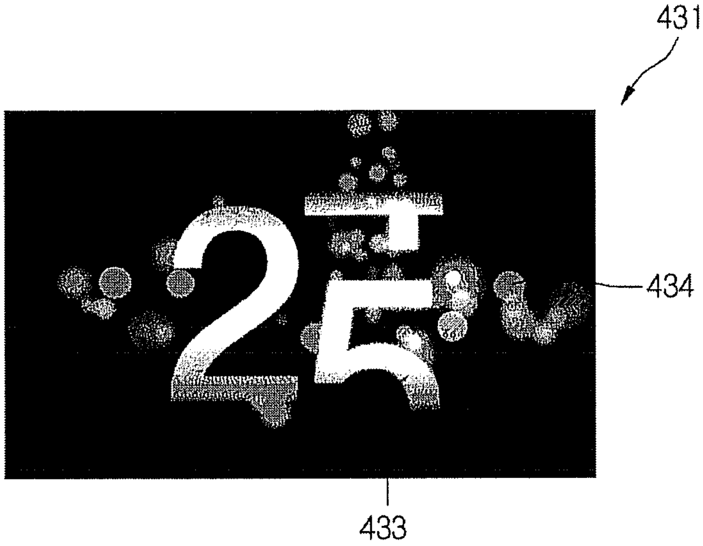
Figure 5C:
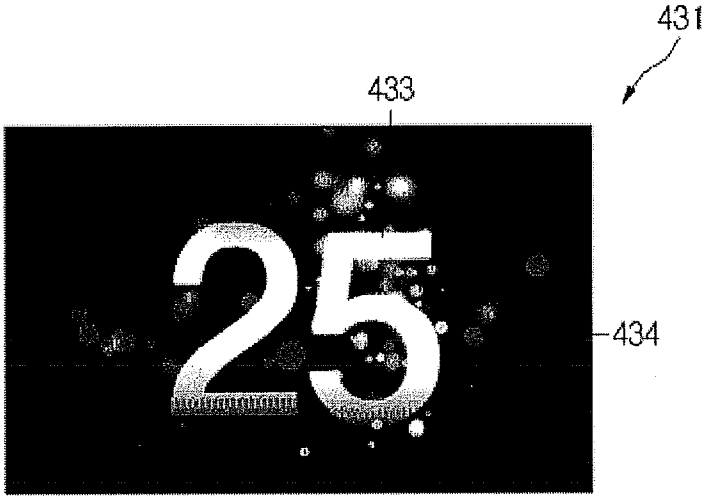
Figure 7A:
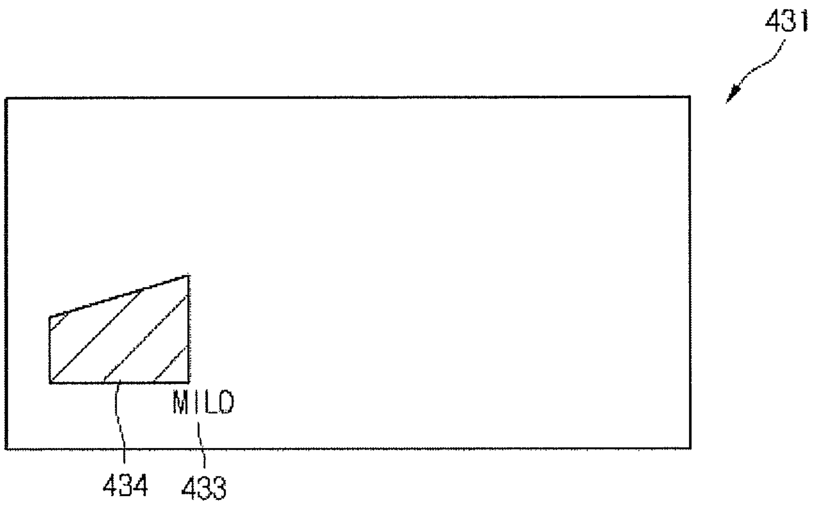
FIGS. 7A to 7D are exemplary display screens of set up information of the air conditioner, according to another embodiment as broadly described herein.
Figure 7B:
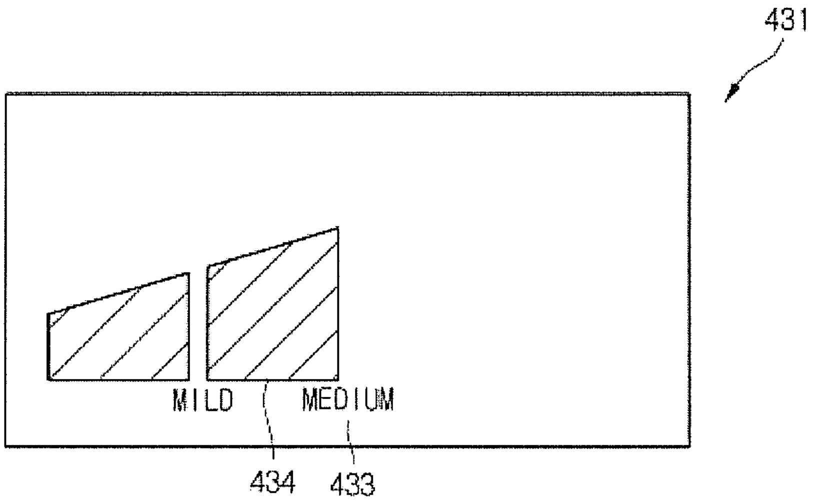
Figure 7C:
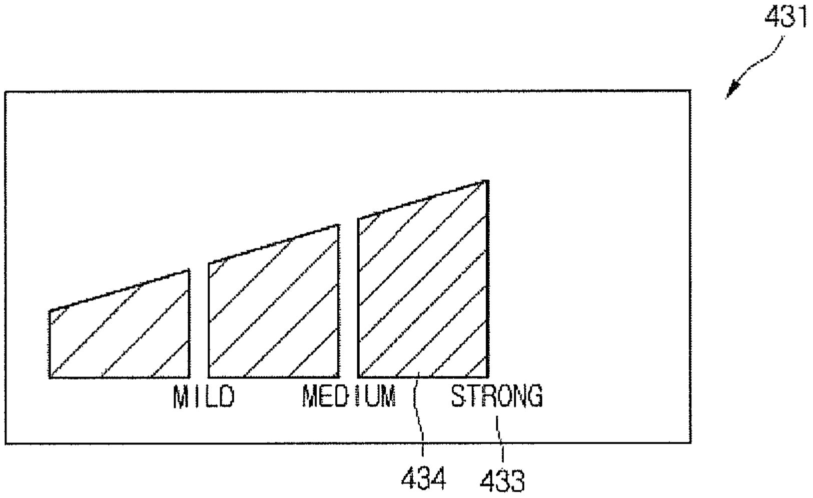
Figure 7D:
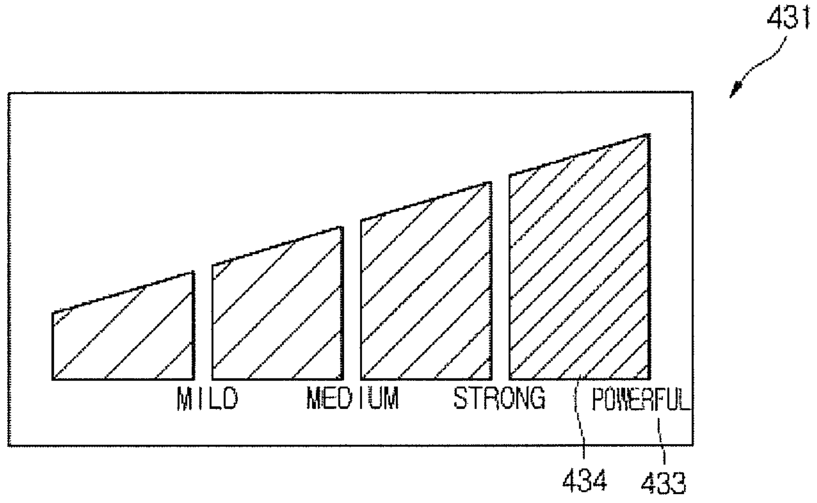

FIGS. 5A to 5C are screens displayed by the image output device 431 of the air conditioner 10 according to an embodiment.

Referring to FIGS. 5A to 5C, the image output device 431 displays an operation information output part 433 where operation information set by the user is displayed, and a plurality of patterns 434 disposed adjacent to the operation information output part 433. The operation information output part 433 directly outputs desired information regarding operation of the air conditioner 10, which may be considered primary information, and the plurality of patterns 434, which may be considered secondary information, are visually changed when information displayed on the operation information output part 433 are changed. The operation information output part 433 may be displayed at, for example, a center of the image output device 431. The operation information output part 433 may show a desired temperature set by the user.

A temperature value output on the operation information output part 433 may be changed by the user. When the temperature value is changed from a relatively low temperature to a relatively high temperature, the operation information output part 433 may display a change in the temperature value sliding from bottom to top. That is, a previous temperature value displayed on the operation information output part 433 may move, or scroll upward, and a newly set temperature value may be generated and move from bottom to top, as shown in FIG. 5B, until the newly set temperature value is displayed as shown in FIG. 5C. Also, when the temperature value changes from a relatively high temperature to a relatively low temperature, the operation information output part 433 may display a change in the temperature value sliding from top to bottom.

Sizes of the plurality of patterns 434 may be different from one another. The patterns may be formed in, for example, circles. However, the size and the shape of the patterns 434 are not limited thereto.

A temperature value displayed at the operation information output part 433 is changed based on a temperature set by the user, and/or the color and the number of the plurality of patterns 434 are changed in correspondence to the change in temperature value.

The temperature value displayed at the operation information output part 433 may be checked by the user on a one-dimensional plane. Also, the temperature value set by the user may be directly output via the operation information output part 433. This may be considered primary information. On the contrary, the patterns 434 may appear to be output three-dimensionally to provide visual volume. That is, the user may experience a sense of direction or of distance with each of the plurality of patterns 434. This may be considered secondary information.

However, information set by the user is not necessarily limited to temperature. For example, the user may control air flow velocity output by the air conditioner 10. Hereinafter, screens displayed by the image output device 431 when the user changes a wind velocity, or air flow velocity, of the air conditioner 10, will be described.

FIG. 6 illustrates a process in which secondary information is changed according to a change in the primary information, according to a another embodiment.

Referring to FIG. 6, the user may provide information regarding operation of the air conditioner 10 to create a suitable indoor environment, including primary information regarding operation of the air conditioner 10 and secondary information capable of being displayed in three dimensions to provide a visual indication of the change in the primary information.

For example, the primary information may relate to a wind velocity, or air flow velocity, and the secondary information may relate to a change of visual patterns corresponding thereto. In other words, when the user changes a desired wind velocity, one of the number of patterns or the intensity of color thereof may be changed accordingly. In detail, areas of the patterns may be divided by a dividing line, or a plurality of the dividing lines. The patterns may be divided into five areas by the dividing lines, and the number of areas where a certain color is filled may be changed according to the wind velocity selected by the user.

Since the change in desired wind velocity may be directly checked by the user via the image output device 431, this may be considered primary information. Since one of the number of the filled patterns and the strength of color thereof may be changed according to a change in the first information, this may be secondary information.

When a relatively low wind velocity is set, the number of filled patterns may be gradually decreased and the strength of color thereof may be gradually decreased. For example, when the user decreases the desired wind velocity by one stage, the number of filled patterns may be decreased by one and the strength of color thereof may be decreased by one stage.

FIGS. 7A to 7D illustrate screens of the image output device 431, where desired information related to the air conditioner is output, according to another embodiment.

Referring to FIGS. 7A to 7D, the image output device 431 displays the operation information output part 433 and the patterns 434 are disposed adjacent to the operation information output part 433. Since the operation information output part 433 directly shows desired information regarding operation of the air conditioner 10, this may be considered primary information. Since the plurality of patterns 434 are visually displayed to allow the user to visually check a change in the information on the operation information output part 433, this may be considered secondary information.

The user may set a velocity of airflow output from the air conditioner 10. The airflow velocity may include a plurality of stages. For example, the wind velocity may include a powerful wind, a strong wind, a medium wind, and a mild wind. Since the wind velocity of the airflow is information regarding operation of the air conditioner 10 set by the user, this may be considered primary information.

In certain embodiments, the patterns 434 may have dividing lines thereof adjacent to the primary information. The patterns 434 may be divided into a plurality of areas by such dividing lines. For example, the patterns 434 may be divided into four areas.

As another example, the number of the patterns 434 may be changed according to a change in the primary information. As an example, when the primary information relates to an air flow velocity, as the flow velocity increases, the number of patterns 434 may also increase.

Also, the strength, or intensity, of the color inside the patterns 434 may be changed according to wind velocity information. For example, when the user selects a mild wind, only one pattern of the plurality of the patterns 434 may be filled with a certain color. Also, when the user sets a gradually stronger wind velocity, the number of patterns 434 may be gradually increased and the strength of color filling inside the patterns 434 may be gradually increased.

However, the strength of color filling the patterns 434 and the number of the patterns 434 according to a wind velocity set by the user are not limited thereto. Also, a desired wind velocity set by the user may be divided into a plurality of stages, but is not limited thereto.

Figure 8:
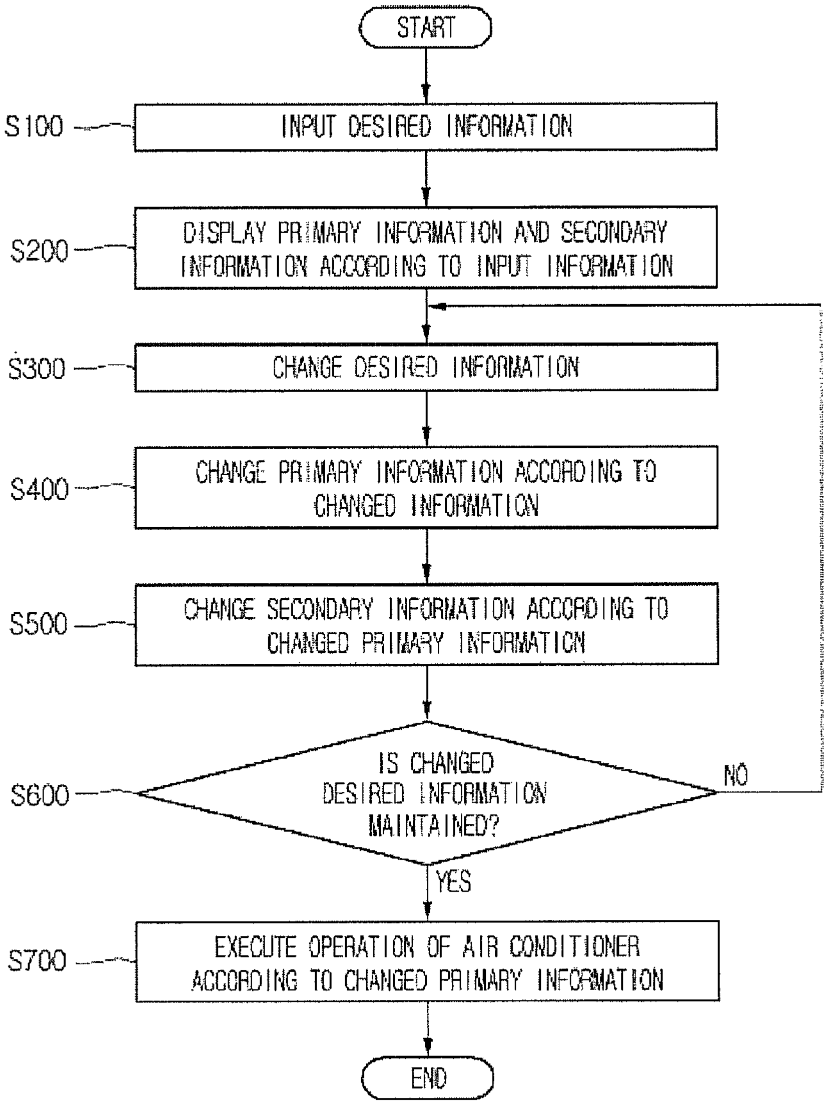
FIG. 8 is a flowchart of operation of the air conditioner, in accordance with embodiments as broadly described herein.

FIG. 8 is a flowchart illustrating operations of the air conditioner 10 according to an embodiment.

Referring to FIG. 8, first, the user inputs desired information to properly control an indoor environment (S100). The image output device 431 outputs primary information regarding operation of the air conditioner 10 according to the desired information and secondary information which may visually change according to a change in the primary information (S200).

After a certain amount of time, the user determines whether or not the indoor environment is properly controlled. According to a result thereof, the user may change the desired information (S300). When the user changes the desired information, the primary information is changed and display on the image output device 431 (S400). Then, according to the changed primary information, secondary information is also changed (S500). In this case, when the user would like to maintain the changed desired information, operation of the air conditioner is performed according to the changed primary information (S700).

As described above, a process of outputting primary information and secondary information via the image output device 431 is provided. However, information set or changed by the user may be checked via a sound output provided from the sound output device 432.

In detail, according to a flow velocity or a temperature set by the user, a sound output from the air conditioner 10 may be changed. The sound, for example, may not directly show a temperature value but may indirectly estimate a temperature set in the air conditioner 10. Also, since being audibly changed according to primary information changed by the user, the sound may be included in the secondary information.

Figure 9A:
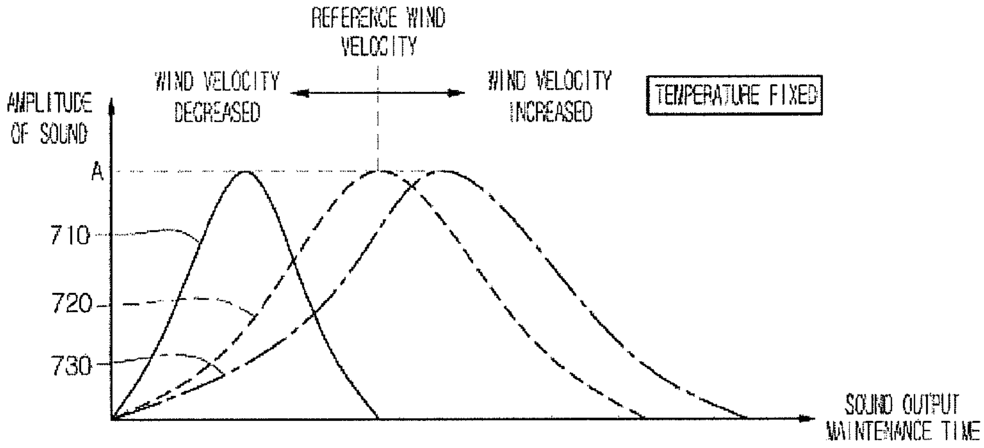
FIGS. 9A and 9B are graphs of changes in sounds output by the air conditioner according to changes in flow velocity and temperature, according to an embodiment as broadly described herein.
Figure 9B:
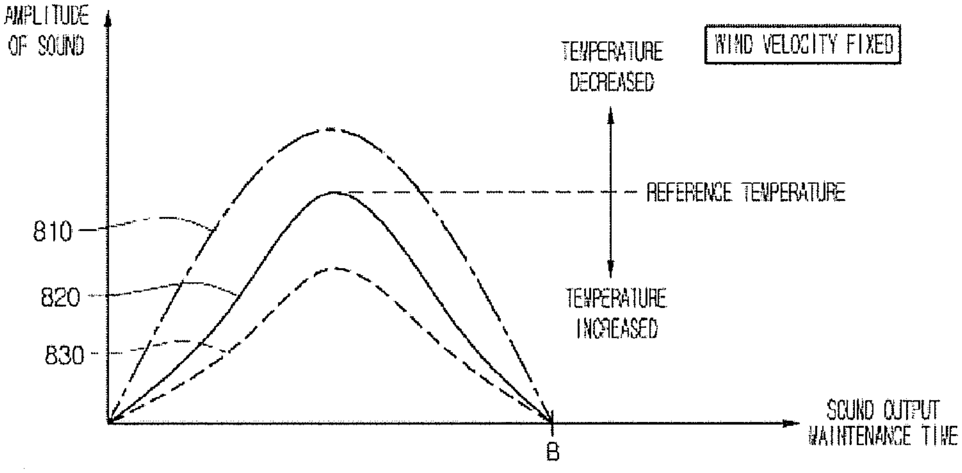

FIGS. 9A and 9B illustrate sound output by the air conditioner 10 according to a change in one of an air flow velocity or a temperature according to an embodiment.

Referring to FIG. 9A, the user may set a velocity of airflow output from the air conditioner 10. The velocity of the airflow may be one selected from a plurality of stages. For example, the velocity of the airflow may include a strong wind, a medium wind, and a mild wind.

For example, the user may select one of a first, second or third velocity, each being different from one another. Depending on the selected flow velocity, a sound output from the air conditioner 10 may be changed. According to sounds output from the air conditioner corresponding to the respective wind velocity, there may be formed first to third waveforms 710, 720, and 730, respectively.

In this case, sounds of amplitudes A output from the air conditioner with respect to the first to third waveforms 710, 720, and 730 are the same. However, an amount of time for outputting sound forming the third waveform 730 is longer than that of the sound when forming the first waveform 710.

For example, a wind velocity set in the air conditioner 10 when forming the second waveform 720 may be a reference wind velocity. When the user sets a wind velocity that is milder than the reference wind velocity, an amount of time for outputting a sound decreases. Accordingly, a sound output from the air conditioner 10 may be output as the first waveform 710.

When the user sets a wind velocity that is stronger than the reference wind velocity, an amount of time for outputting a sound increases. Accordingly, a sound output from the air conditioner 10 may be output as the third waveform 730.

In this case, since a temperature set in the air conditioner 10 by the user is uniformly maintained, amplitudes of sounds output from the air conditioner 10 may be the same when forming the first to third waveforms 710, 720, and 730. In other words, when the user controls a wind velocity of the air conditioner 10, amplitudes of sounds output from the air conditioner 10 may be the same but amounts of time for continuously outputting the sounds may be different.

Referring to FIG. 9B, the user may set a temperature of airflow output from the air conditioner 10. The temperature of the airflow may be controlled using a plurality of methods. For example, the user may control the temperature of the airflow using a remote device such as a remote control or may directly control the temperature of the airflow via an operation unit including temperature control buttons. The temperature of the airflow capable of being set by the user may include a plurality of stages.

For example, the user may select any one of a first temperature to a third temperature. According to the temperature of the airflow, sounds output from the air conditioner 10 may be changed. According to sounds output from the air conditioner 10 with respect to first temperature to the third temperature, fourth to sixth waveforms 810, 820, and 830 may be formed.

In this case, an amount of time B for outputting sounds from the air conditioner 10 with respect to the fourth to sixth waveforms 810, 820, and 830 are the same. However, amplitude of the sound output when forming the fourth waveform 810 is greater than that of the sound output when forming the sixth waveform 830.

For example, a temperature set in the air conditioner 10 when forming the fifth waveform 830 may be a reference temperature. When the user sets a temperature of airflow lower than the reference temperature, amplitude of a sound increases. Accordingly, the sound output from the air conditioner 10 may be output as the fourth waveform 810.

Also, when the user sets a temperature of airflow higher than the reference temperature, amplitude of the sound decreases. Accordingly, the sound output from the air conditioner 10 may be output as the sixth waveform 830.

In this case, since a wind velocity set in the air conditioner 10 by the user is uniformly maintained, amounts of time for outputting the sounds from the air conditioner 10 when forming the fourth to sixth waveforms 810, 820, and 830 are the same. In other words, when the user sets a temperature of the air conditioner 10, the amounts of time for outputting the sounds from the air conditioner may be the same but amplitudes of the sounds may be different.

As described above, a plurality of sound waveforms may be output from the air conditioner 10 when classifying a desired temperature and a desired wind velocity set by the user for operating the air conditioner 10 into three stages, respectively. However, the desired temperature and the desired wind velocity are not limited thereto, and a plurality of temperatures and/or a plurality of wind velocities including a larger number of stages may be applied.

The number of melodies of the sounds output from the air conditioner 10 may be changed according to the desired temperature. For example, when temperatures set by the user are classified into three stages and a lowest temperature thereof is designated as a first temperature, the air conditioner 10 may output a sound such as "ding dong daeng dong" at the first temperature. When the user sets a second temperature, the air conditioner 10 may output a sound such as "ding dong daeng". When the user sets a third temperature, the air conditioner 10 may output a sound such as "ding dong".

Embodiments as described above may be explained using Table 1 below.

TABLE 1

| Temperature | Number of melodies |
|---|---|
| Not more than 22° C. | 4 |
| 22° C. to 26° C. | 3 |
| Not less than 26° C. | 2 |

In other words, sound output by the air conditioner 10 may have sounds with different amplitudes and with different numbers of melodies according to the set temperatures. However, the sounds outputted from the air conditioner 10 are not limited thereto, and the numbers of melodies for temperature values are not limited as shown in Table 1.

The sounds may be output via the sound output device 432. Also, according to a sound outputted via the sound output unit 432, the user may estimate a set temperature or a set wind velocity.

Accordingly, information output via the sound output device 432 may be secondary information that has been audibly changed according to primary information changed by the user.

According to embodiments as broadly described herein, an operation state of an air conditioner may be changed according to at least one of a temperature or a wind velocity set by a user. Accordingly, the user may easily recognize whether operation of the air conditioner is smoothly performed according to the operation state set by the user.

Also, since the user may easily recognize malfunctions, user convenience may be increased.

Embodiments provide a display device of an air conditioner, the display device allowing a user to easily check whether the air conditioner is properly operated according to an operation method preset by the user, and a method of controlling the display device.

In one embodiment, a display device for an air conditioner may include an input unit receiving input information regarding operation of the air conditioner, a control unit comparing the input information with previously mapped information and controlling the operation of the air conditioner, and an output unit outputting first information regarding the operation of the air conditioner based on a control command of the control unit. The control unit may control second information changed visually or aurally to be outputted on the output unit when the input information regarding the first information is changed.

In another embodiment, a method of controlling a display device of an air conditioner may include changing input information regarding operation of the air conditioner, changing and outputting first information according to a change of the input information, and visually or aurally changing and outputting second information according to a change of the first information.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A notification device of an air conditioner, the device comprising:

an input that receives information regarding operation of the air conditioner; and an output that outputs primary information regarding the operation of the air conditioner based on a control command received from a controller that controls operation of the air conditioner, wherein secondary information related to the primary information output by the output is visually or audibly changed in response to a change in the primary information, and wherein the secondary information comprises a plurality of sound waveforms respectively defined by a plurality of amplitudes and lengths of time of sustained sound output.

2. The device of claim 1, wherein the secondary information comprises a plurality of patterns displayed by the output, wherein a number of the plurality of patterns is changed in response to the change in the primary information.

3. The device of claim 2, wherein the primary information comprises a temperature, and wherein the number of the plurality of patterns is increased when a desired temperature set at the input is relatively low, and the number of the plurality of patterns is decreased when the desired temperature is relatively high.

4. The device of claim 2, wherein the primary information comprises an air flow velocity, and wherein the number of the plurality of patterns is increased when a desired air flow velocity set at the input is relatively high, and the number of the plurality of patterns is decreased when the desired air flow velocity is relatively low.

5. The device of claim 2, wherein the primary information comprises a temperature, and wherein the number of patterns displayed on the output increases as a set temperature increases, and the number of patterns decreases as the set temperature decreases.

6. The device of claim 2, wherein the primary information comprises an air flow velocity, and wherein the number of patterns displayed on the output increases as a set air flow velocity increases, and the number of patterns decreases as the set air flow velocity decreases.

7. The display device of claim 1, wherein the secondary information comprises a plurality of patterns filled with one or more colors, and wherein an intensity of the one or more colors filled in the plurality of patterns is changed in response to a change in the primary information.

8. The device of claim 7, wherein the primary information comprises a temperature, and wherein the intensity of the color filling the plurality of patterns is increased when a set temperature is relatively low, and the intensity of the color filling the plurality of patterns is decreased when the set temperature is relatively high.

9. The device of claim 7, wherein the primary information comprises an air flow velocity, and wherein the intensity of the color filling the patterns is increased when a set air flow velocity is relatively high, and the intensity of the color filling the plurality of patterns is decreased when the set air flow velocity is relatively low.

10. The display device of claim 1, wherein the primary information comprises a temperature, and wherein the amplitude of the sound is increased when a desired temperature set at the input is relatively low, and the amplitude of the sound is decreased when the desired temperature is relatively high.

11. The device of claim 1, wherein the primary information comprises an air flow velocity, and wherein the length of time of the sustained sound output is increased when a desired air flow velocity set at the input is relatively high, and the length of time of sustained sound output is decreased when the desired air flow velocity is relatively low.

12. The device claim 10, wherein at least one of the amplitude of the sound or the length of time of sustained output of the sound is increased or decreased by a predetermined rate.

13. The device of claim 11, wherein at least one of the amplitude of the sound or the length of time of sustained output of the sound is increased or decreased by a predetermined rate.

14. The device of claim 1, wherein the output comprises an image output device outputting an image and a sound output outputting a sound.

15. A method of controlling a notification device of an air conditioner, the method comprising:

receiving input information regarding operation of the air conditioner, the input information being a change from previously received input information;

outputting primary information corresponding to the received change in the input information; and visually or audibly outputting secondary information based on the change in the primary information, and wherein visually or audibly outputting secondary information comprises outputting a plurality of sound waveforms respectively defined by a plurality of amplitudes of sounds and lengths of time of continuously outputting the sounds.

16. The method of claim 15, wherein receiving input information comprises receiving information regarding one of a temperature or an air flow velocity to be generated by the air conditioner.

17. The method of claim 15, wherein visually or audibly outputting secondary information comprises outputting one or more patterns and adjusting at least one of a number of the patterns or an intensity of a color of the patterns based on the change in the primary information.

* * * * *